3,468,661
PHOTOGRAPHIC MATERIAL SENSITIZED WITH A TRIMETHINE DYE CONTAINING A BENZOYL SUBSTITUTED BENZIMIDAZOLE NUCLEUS
Marcel Jan Libeer and Henri Depoorter, Mortsel-Antwerp, Belgium, assignors to Gevaert Photo-Producten N.V., Mortsel-Antwerp, Belgium, a company of Belgium
Filed Jan. 14, 1964, Ser. No. 337,665
Claims priority, application Great Britain, Dec. 31, 1963, 51,334/63
Int. Cl. G03c 1/18
U.S. Cl. 96—1.7
6 Claims

ABSTRACT OF THE DISCLOSURE

A photographic material optically sensitized with a trimethine dye having at least one benzimidazole nucleus substituted in the 5- or 6-position with a benzoyl group is described.

---

Figure 1:
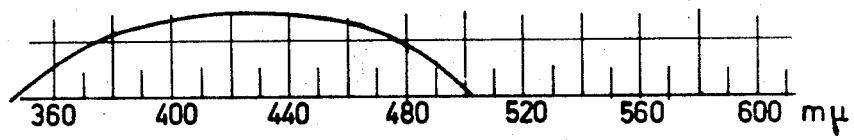

This invention relates to new methine dyes, to methods for preparing them and to their use as optical sensitizing agents in light-sensitive materials. More particularly this invention relates to trimethine dyes containing at least one benzimidazole nucleus substituted in the 5- or 6-position by a benzoyl radical.

Trimethine dyes containing a benzimidazole nucleus substituted in the 5- or 6-position by an acetyl radical are known. In comparison with these known trimethine dyes the dyes according to the present invention, when incorporated into silver halide emulsions, are characterized by a less tendency to J-band formation and by a displacement of the sensitization range to the shorter wavelengths whereby the optical sensitization range overlaps with the inherent sensitivity range of the emulsion.

Apart from their use as optical sensitizers for photographic silver halide emulsions the new trimethine dyes can also be applied in electrophotographic materials, the light-sensitive layer of which contains the usual photoconductive substances such as, e.g., photoconductive zinc oxide.

So, it is an object of the present invention to provide a new class of trimethine dyes. A further object is to provide methods for preparing these new dyes. Still another object is to provide photographic silver halide emulsions sensitized with these new dyes, and methods for preparing these emulsions. Other objects will become apparent from the description and examples.

The new trimethine dyes of the present invention can be represented by the following general Formula I:

(I)
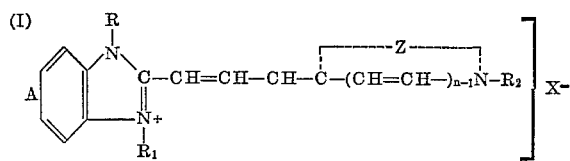

wherein:

A represents a benzoyl group in the 5- or 6-position of the benzimidazole nucleus;

each of R, $R_1$ and $R_2$ represents (the same or different) an alkyl group such as methyl, ethyl, n-propyl, n-butyl, n-amyl, isopropyl, isobutyl, a substituted alkyl radical such as β-hydroxyethyl, β-acetoxyethyl, sulfoethyl, sulfopropyl, sulfobutyl, propyl sulfate or butyl sulfate, an unsaturated organic group such as allyl, an aralkyl radical such as benzyl, a substituted benzyl radical such as carboxybenzyl, an aryl radical such as phenyl, a substituted aryl radical such as carboxyphenyl, a cyclo-alkyl radical such as cyclohexyl; further $R_1$ and/or $R_2$ may also represent (the same or different) a substituted alkyl group such as the group

—A—CO—O—B—$SO_2$—OH wherein each of A and B represents a hydrocarbon group as described in the United Kingdom patent specification 886,271, or the group —A—W—NH—V—B, wherein A represents a methylene radical, an ethylene radical, a propylene radical or a butylene radical, B represents an alkyl group, an amino group, a substituted amino group and also a hydrogen atom if V is a single bond, and each of W and V represents a —CO— radical, a —$SO_2$— radical or a single bond, but at least one of them is a —$SO_2$— radical as described in the United Kingdom patent specification 904,332;

$n$ represents the positive integer 1 or 2;

X represents an acid radical such as, e.g., chloride, bromide, iodide, perchlorate, benzene sulfonate, p-toluenesulfonate, methyl sulfonate and ethyl sulfonate;

Z represents the atoms necessary to complete a benzimidazole nucleus substituted in the 5- or 6-position with a benzoyl group or a heterocyclic nitrogen nucleus containing 5 to 6 atoms in the heterocyclic ring such as those of the thiazole series (e.g., thiazole, 4-methylthiazole, 4-phenylthiazole, 5-methylthiazole, 5-phenylthiazole, 4,5-dimethylthiazole, 4,5-diphenylthiazole, 4-(2-thienyl)-thiazole), those of the benzothiazole series (e.g. benzothiazole, 4-chlorobenzothiazole, 5-chlorobenzothiazole, 6-chlorobenzothiazole, 7-chlorobenzothiazole, 4-methylbenzothiazole, 5-methylbenzothiazole, 6-methylbenzothiazole, 5-bromobenzothiazole, 6-bromobenzothiazole, 4-phenylbenzothiazole, 5-phenylbenzothiazole, 4-methoxybenzothiazole, 5-methoxybenzothiazole, 6-methoxybenzothiazole, 5-iodobenzothiazole, 6-iodobenzothiazole, 4-ethoxybenzothiazole, 5-ethoxybenzothiazole, 4,5,6,7-tetrahydrobenzothiazole, 5,6-dimethoxybenzothiazole, 5,6 - dioxymethylenebenzothiazole, 5-hydroxybenzothiazole, 6-hydroxybenzothiazole, 5,6-dimethylbenzothiazole), those of the naphthothiazole series (e.g., naphtho[2,1-d]thiazole, naphtho[1,2-d]thiazole, 5-methoxynaphtho[1,2-d]thiazole, 5-ethoxynaphtho[1,2-d]thiazole, 8 - methoxynaphtho[2,1-d]thiazole, 7-methoxynaphtho[2,1-d]thiazole), those of the thionaphtheno[7,6,d]thiazole series (e.g. 7-methoxythionaphtheno[7,6,d]thiazole), those of the oxazole series (e.g., 4-methyloxazole, 5-methyloxazole, 4-phenyloxazole, 4,5-diphenyloxazole, 4-ethyloxazole, 4,5-dimethyloxazole, 5-phenyloxazole), those of the benzoxazole series (e.g., benzoxazole, 5-chlorobenzoxazole, 5 - methylbenzoxazole, 5-phenylbenzoxazole, 6-methylbenzoxazole, 5,6 - dimethylbenzoxazole, 4,6-dimethylbenzoxazole, 5-methoxybenzoxazole, 6-methoxybenzoxazole, 5 - hydroxybenzoxazole, 6-hydroxybenzoxazole), those of the naphthoxazole series (e.g., naphtho[2,1-d]oxazole, naphtho[1,2-d]oxazole), those of the selenazole series (e.g., 4-methylselenazole, 4-phenylselenazole), those of the benzoselenazole series (e.g., benzosenazole, 5-chlorobenzoselenazole, 5-methoxybenzoselenazole, 5-hydroxybenzoselenazole, 4,5,6,7-tetrahydrobenzoselenazole), those of the naphthoselenazole series (e.g., naphtho[2,1-d]selenazole, naphtho[1,2-d]selenazole), those of the thiazoline series (e.g., thiazoline, 4-methylthiazoline, 4-hydroxymethyl-4-methylthiazoline, 4,4 - bis-hydroxymethylthiazoline, 4-acetoxymethyl - 4 - methylthiazoline, 4,4-bis-acetoxymethylthiazoline), those of the thiazolidine series (e.g. 2-benzothiazolylidene-4-thiazolidone), those of the oxazoline series (e.g., oxazoline, 4-hydroxymethyl-4-methyloxazoline, 4,4-bishydroxymethyloxazoline, 4-acetoxymethyl-4 - methyloxazoline, 4,4 - bisacetoxymethyloxazoline), those of the oxazolidine series, those of the selenazoline series (e.g., selenazoline), those of the 2-quinoline series (e.g., the quinoline, 3-methylquinoline, 5-methylquinoline, 7 - methylquinoline, 8-methylquinoline, 6-chloroquinoline, 8-chloroquinoline, 6-methoxyquinoline, 6-ethoxyquinoline, 6-hydroxyquinoline, 8-hydroxyquinoline, etc.), those of the 4-quinoline series (e.g., quinoline, 6-methoxyquinoline, 7-methylquinoline, 8-methylquinoline), those of the 1-isoquinoline series (e.g., isoquinoline, 3,4-dihydroisoquinoline), those of the 3-isoquinoline series (e.g., isoquinoline), those of the 3,3-dialkylindolenine series (e.g., 3,3-dimethylindolenine, 3,3,5-trimethylindolenine, 3,3,7-trimethylindolenine), those of the pyridine series (e.g., pyridine, 5-methylpyridine), those of the benzimidazole series (e.g.

1-ethylbenzimidazole,
1-phenylbenzimidazole,
1-ethyl-5,6-dichlorobenzimidazole,
1-hydroxyethyl-5,6-dichlorobenzimidazole,
1-ethyl-5-chlorobenzimidazole,
1-ethyl-5,6-dibromobenzimidazole,
1-ethyl-5-chloro-6-aminobenzimidazole,
1-ethyl-5-chloro-6-bromobenzimidazole,
1-ethyl-5-phenylbenzimidazole,
1-ethyl-5-fluorobenzimidazole,
1-ethyl-5-cyanobenzimidazole,
1-($\beta$-acetoxyethyl)-5-cyanobenzimidazole,
1-ethyl-5-chloro-6-cyanobenzimidazole,
1-methyl-5-fluoro-6-cyanobenzimidazole,
1-ethyl-5-acetylbenzimidazole,
1-ethyl-5-chloro-6-fluorobenzimidazole,
1-ethyl-5-carboxybenzimidazole,
1-ethyl-7-carboxybenzimidazole,
1-ethyl-5-carbethoxybenzimidazole,
1-ethyl-7-carbethoxybenzimidazole,
1-ethyl-5-sulfonamidobenzimidazole,
1-ethyl-5-N-ethylsulfonamidobenzimidazole).

The trimethine dyes according to this invention preferably are prepared starting from a reactive intermediate product corresponding to the following general Formula II:

(II)
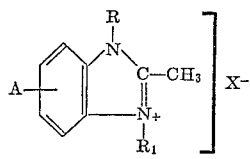

wherein A, R, $R_1$ and $X^-$ have the same significance as set forth above.

The following preparation illustrates how the intermediate products according to Formula II are prepared.

PREPARATION OF 1,3-DIETHYL-2-METHYL-5-BENZOYLBENZIMIDAZOLIUM IODIDE

This intermediate product is prepared by the following steps.

(a) Preparation of 3 - nitro - 4-ethylaminodiphenylketone: 7.85 g. of 3-nitro-4-chlorodiphenylketone prepared according to Maron and Fox, Ber. 1914, 2777, and 9 g. of a 50% aqueous solution of ethylamine are dissolved in 50 cm.³ of absolute ethanol and then refluxed for 30 minutes. After cooling, the crystallized product is sucked off and recrystallized from ethanol. Melting point: 101° C.

(b) Preparation of 3-amino-4-ethylamino-diphenylketone: 28.2 g. of 3-nitro-4-ethylaminodiphenylketone dissolved in 240 ml. of ethanol are hydrogenated with 2 g. of Raney nickel as a catalyst under a pressure of 850 p.s.i. hydrogen at 50° C. Thereupon the catalyst is filtered off and the filtrate is evaporated. The residue is used for the preparation of 1-ethyl-2-methyl-5-benzoylbenzimidazole.

(c) Preparation of 1-ethyl-2-methyl-5-benzoylbenzimidazole: 24 g. of the above residue is dissolved in 10 cm.³ of acetic acid and 80 cm.³ of 5 N hydrochloric acid. The solution is refluxed for 40 min.

The solution obtained is made slightly ammoniacal and then extracted with chloroform. After drying, the chloroform is evaporated and the residue is vacuum-distilled. Boiling point: 250° C./2 mm. Hg.

(d) Preparation of 1,3-diethyl-2-methyl-5-benzoylbenzimidazole iodide: 50.4 g. of 1-ethyl-2-methyl-5-benzoylbenzimidazole and 34.3 g. of ethyl iodide are mixed and heated for 15 hours in a sealed tube at 110°. The reaction mass is washed with ether and recrystallized from ethanol. Melting point: 163° C.

New asymmetrical and symmetrical trimethine dye salts according to the present invention can be prepared by condensing the benzimidazolium salt according to the general Formula II with a cycloammonium quaternary salt represented by the following Formula III:

(III)
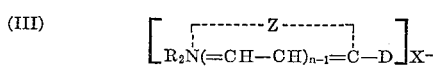

wherein: $R_2$, X, Z and n have the same value as set forth above, and D represents a $\beta$-arylaminovinyl group, a $\beta$-alkylmercaptovinyl group, a $\beta$-arylmercaptovinyl group, a $\beta$-acetanilidovinyl group or a $\beta$-p-tolusulfanilidovinyl group, which vinyl groups may carry a substituent. The condensation of this type are advantageously carried out in the presence of a basic condensing agent, for example a trialkylamine such as triethylamine, a dialkylaniline, a heterocyclic tertiary amine such as pyridine or N-alkylpiperidine or the like. The condensations of this type can be carried out whether or not by heating the intermediates in the presence of an inert diluent such as, e.g., methanol, ethanol, diethyl ether, acetone, 1,4-dioxane.

New asymmetrical trimethine dye salts according to the present invention can also be prepared by condensing benzimidazolium salts of the general Formula II with a heterocyclic base of the following Formula IV (IV)
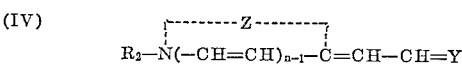

wherein:

$R_2$, Z and n have the same value as set forth above, and Y represents a reactive atom such as an oxygen atom, a sulfur atom, a selenium atom or a reactive group such as an aryl-N= group, e.g., a $C_6H_5$—N= group The condensation of this type is advantageously carried out in the presence of an acid anhydride such as acetic anhydride.

New symmetrical trimethine dye salts can also be prepared by condensing a benzimidazolium salt according to the general Formula II with an orthocarboxylic acid alkyl ester, such as ethyl orthoformiate, advantageously in a nitrobenzene solution.

The following examples illustrate the preparation of the trimethine dyes according to the present invention:

Example 1

The sensitizing dye of the formula:

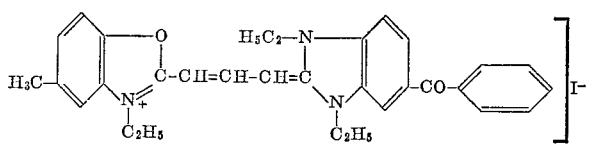

is prepared as follows:

1.4 g. of 2-phenyliminoethylidene-3-ethyl-5-methyl-2,3-dihydrobenzoxazole and 2.1 g. of 1,3-diethyl-2-methyl-5-benzoylbenzimidazolium iodide are dissolved in 15 cm.³ of acetic anhydride. Then 1.4 cm.³ of triethylamine is added and the mixture is stirred for 2 hours at room temperature whereupon it is boiled for 10 minutes. The dye is purified by recrystallizing four times from methanol. Melting point: above 250° C. Absorption maximum: 491 m$\mu$; log $\epsilon$ 5.12.

Example 2

The sensitizing dye of the formula

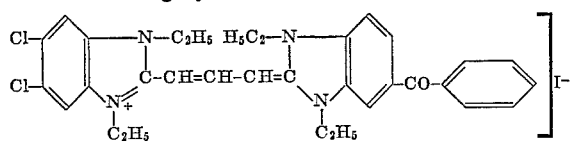

is prepared as follows:

2.75 g. of 1,3-diethyl-2-[β-(p-tolusulfanilido)-vinyl]-5,6-dichlorobenzimidazolium chloride and 2.1 g. of 1,3-diethyl-2-methyl-5-benzoylbenzimidazolium iodide are dissolved in 15 cm.³ of pyridine. Then 1.4 cm.³ of triethylamine is added and the mixture is refluxed for 30 minutes. After cooling the dye is precipitated by means of ether, filtered and purified by recrystallizing four times from ethanol. Melting point: above 260° C. Absorption maximum: 518 mμ; log ε 5.20.

Example 3

The sensitizing dye of the formula

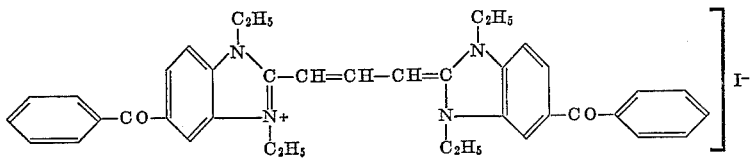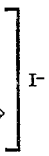

is prepared as follows:

4.2 g. of 1,3-diethyl-2-methyl-5-benzoylbenzimidazolium iodide is dissolved in 20 cm.³ of nitrobenzene whereupon 4.2 cm.³ of ethylorthoformate is added. The mixture is refluxed for 1 hour. The dye is precipitated by means of ether and recrystallized three times from ethanol. Melting point: 199° C. Absorption maximum: 524 mμ; log ε 5.31.

Example 4

The sensitizing dye of the formula

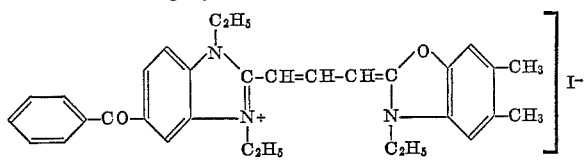

is prepared in an analogous way as the dyestuff of Example 1. Melting point: 195° C. Absorption maximum: 497 mμ; log ε 5.06.

Example 5

The sensitizing dye of the formula

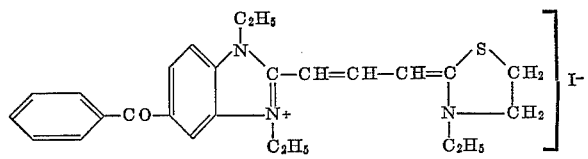

is prepared as follows:

1.5 g. of 2-acetanilidovinyl-3-ethylthiazolinium iodide and 2.1 g. of 1,3-diethyl-2-methyl-5-benzoylbenzimidazolium iodide are dissolved in 15 cm.³ of acetic anhydride. Then 1.4 cm.³ of triethylamine is added whereupon the mixture is refluxed for 30 minutes. The dyestuff is precipitated by means of ether and recrystallized four times from ethanol. Melting point: 226° C. Absorption maximum: 473 mμ; log ε 4.95.

The methine dyes of the present invention spectrally sensitize photographic silver halide emulsions when incorporated therein. Although these methine dyes are especially useful for extending the spectral sensitivity of silver halide emulsions, the methine dyes according to this invention possess also optical sensitizing properties for photoconductive compounds, e.g., photoconductive zinc oxide.

The dyestuffs of Examples 1–4 are very good sensitizers for all kinds of silver halide emulsions. The dyestuffs of Examples 1 and 4 sensitize a silver halide emulsion with a maximum at 540 mμ, 550 mμ, respectively; in appropriate circumstances a J-maximum is obtained at 560/565 mμ. With the dyestuffs of Examples 2 and 3 a J-maximum is obtained between 580 and 590 mμ dependent on the concentration of the dyestuff in the silver halide emulsion. However, in certain circumstances a sensitization without J-maximum is obtained with the benzoyl benzimidazole carbocyanine of Example 3; the sensitization maximum being then 570 mμ.

The dyestuff of Example 5 is especially suitable for sensitizing silver bromochloride emulsions; the sensitization maximum being 515 mμ.

The new methine dyes according to this invention are preferably incorporated in a photoconductive layer, e.g. containing photoconductive zinc oxide, in an amount of 0.05 to 1.0 mole percent in respect of the photoconductive substance.

It may be further noticed that the new methine dyes, although they are especially useful for extending the spectral sensitivity of the customarily employed gelatino silver chloride, gelatino silver chlorobromide, gelatino silver bromide, gelatino silver bromoiodide and gelatino silver chlorobromoiodide emulsions, photographic emulsions containing water-permeable colloids other than gelatin, such as agar-agar, zein, collodion, water-soluble cellulose derivatives, polyvinyl alcohol or other hydrophilic synthetic or natural resins or polymeric compounds, may equally well be sensitized according to the present invention.

To prepare photographic emulsions sensitized according to this invention with one or more of the new methine dyes, the methine dyes are incorporated in the photographic emulsion by one of the methods customarily employed in the art. In practice, it is convenient to add the dyes to the emulsion in the form of a solution in an appropriate solvent, e.g., methanol or ethanol. The new methine dyes can be incorporated at any stage of the preparation of the emulsion and should be uniformly distributed throughout the emulsion. The concentration of the dyes in the emulsion can vary widely, for example from 1 to 200 mg. per kg. of flowable emulsion and will vary according to the effect desired. The suitable and most economical concentration for any given emulsion will be apparent to those skilled in the art, upon making the ordinary tests and observations customarily used in the art of emulsion making.

The new methine dyes can be incorporated into photographic emulsions the general sensitivity of which has been increased by physical and chemical ripening. As suitable chemical sensitizers may be mentioned the well-known sulphur sensitizers such as allylisothiocyanate, allylthiourea, sodium thiosulphate, potassium selenocyanide, the natural sensitizers originating in the gelatin, the reducing sensitizers such as imino-aminomethane sulphinic acid and the derivatives thereof, further cadmium salts, and the salts of noble metals such as gold, platinum and palladium.

In preparing the photographic emulsions according to the invention, the usual and suitable addenda such as antifogging agents, stabilizers, antibronzing agents, hardeners, wetting agents, plasticizers, development accelerators, colour couplers, fluorescent brighteners and ultraviolet screening compounds can moreover be incorporated in the emulsion in the manner customarily employed in the art. In this respect it may be mentioned that the sensitivity of the silver halide emulsions sensitized according to the process of the present invention is not adversely affected but rather enhanced by the presence therein of certain fluorescent compounds. Another advantage of the process for sensitizing silver halide emulsions according to the present invention is the compatibility of the new methine dyes with anionic wetting agents and with colour couplers, which is of great importance in the application of the new methine dyes for sensitizing the silver halide emulsions of a light-sensitive element for colour photography.

Emulsions sensitized with the new methine dyes can be coated in the usual manner on a suitable support such as glass, cellulose derivative film, resin film or paper.

The following photographic tests have been carried out to further illustrate the present invention.

*Series of tests A.*—To three equal amounts of a contrasty silver bromoiodide emulsion containing 0.32 mole of silver halide per kg. (1.5 mole percent of iodide) are added the amounts of sensitizer listed in Table I.

The three emulsions are coated onto a separate transparent cellulose triacetate support in such a way that 0.05 mole of silver halide is present per sq. m.

The materials A.1, A.2 and A.3 thus obtained are exposed in a spectrograph through a continuous wedge by means of a light source having a colour temperature of 2.850° K.

Figure 2:
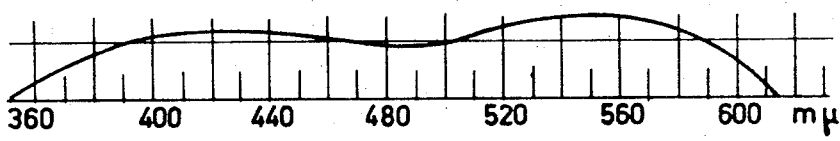
Figure 3:
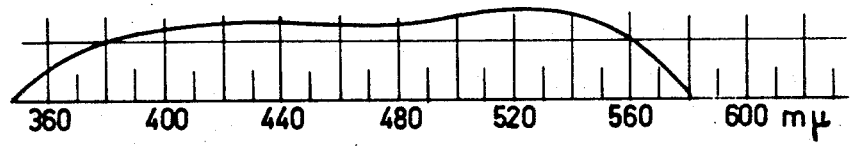

The exposed materials are developed in the same way. Reproductions of the spectra of tests A.1, A.2 and A.3 are given in FIGS. 1, 2 and 3, respectively. The sensitometric results are listed in Table I.

TABLE I

| Test | Dyestuff of example | Millimole of dyestuff per mole of silver halide | Sensitivity (log E)$\Delta$ | | Gamma | Fog (density) |
| --- | --- | --- | --- | --- | --- | --- |
| A.1 | | | 1.40 | | 4.4 | 0.04 |
| A.2 | 3 | 0.08 | 1.22 | 0.18 | 4.4 | 0.09 |
| A.3 | 4 | 0.10 | 1.28 | 0.12 | 4.7 | 0.05 |

*Series of tests B.*—To two amounts of a bromochloride emulsion (65 mole percent of silver bromide) containing 0.20 mole of silver halide per kg. of emulsion ready for coating are added the amounts of sensitizer listed in Table II.

The emulsions are coated onto a separate paper support in such a way that 0.015 mole of silver halide is present per sq. m.

Figure 4:
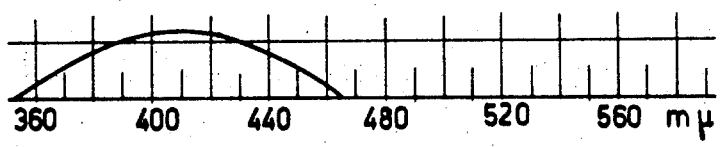
Figure 5:
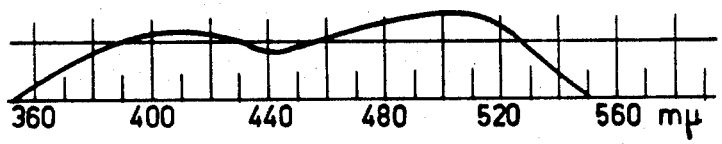

The materials B.1 and B.2 are exposed and developed as the materials of tests A. Reproductions of the spectra B.1 and B.2 are given in FIGS. 4 and 5, respectively. The sensitometric results are listed in Table II.

TABLE II

| Test | Dyestuff of example | Millimole of dyestuff per mole of silver halide | Sensitivity (log E)$\Delta$ | | Gamma | Fog (density) |
| --- | --- | --- | --- | --- | --- | --- |
| B.1 | | | 1.60 | | 1.77 | 0.06 |
| B.2 | 5 | 0.18 | 2.99 | 0.61 | 2.85 | 0.06 |

*Series of tests C.*—To six equal amounts of a zinc oxide dispersion in toluene containing per liter 3.7 moles of zinc oxide, copoly(vinyl acetate/vinyl laurate) (85/15) as binding agent 1% by weight of monobutyl phosphate relative to the amount of zinc oxide as dispersing agent are added the amounts of sensitizer listed in Table III.

The zinc oxide dispersion thus sensitized are coated onto an appropriate paper support in such a way that 0.23 mole of zinc oxide is present per sq. m. whereupon they are dried.

The materials thus obtained are negatively charged with a corona and exposed through a step-wedge with a constant 0.1. After development of the latent image with a triboelectrically charged powder the relative sensitivities listed in Table III were measured.

TABLE III

| Test | Dyestuff of example | Millimole of dyestuff per mole of zinc oxide | Relative sensitivity | Sensitization max.(m$\mu$)) |
| --- | --- | --- | --- | --- |
| C.1 | | | 100 | <380 |
| C.2 | 1 | 0.07 | 625 | 502 |
| C.3 | 2 | 0.06 | 635 | 529 |
| C.4 | 3 | 0.06 | 800 | 533 |
| C.5 | 4 | 0.07 | 780 | 509 |
| C.6 | 5 | 0.08 | 500 | 483 |

What we claim is:

1. A photographic material including a light-sensitive layer containing a photoconductive substance and a trimethine dye salt having the general formula:

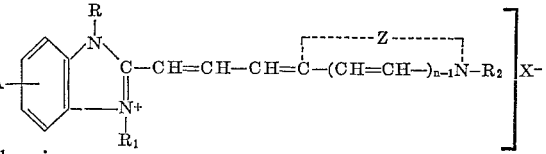

wherein:

A represents a benzoyl group in the 5- or 6-position of the benzimidazole nucleus;

R, $R_1$ and $R_2$ each represents an alkyl group, a substituted alkyl group, an allyl group, an aryl group, a substituted aryl group, a benzyl group, a substituted benzyl group or a cycloalkyl group;

$n$ represents 1 or 2;

Z represents a member of the group selected from the group consisting of a thiazole nucleus, benzothiazole nucleus, naphthothiazole nucleus, thionaphtheno [7,6-d]thiazole nucleus, oxazole nucleus, benzoxazole nucleus, naphthoxazole nucleus, selenazole nucleus, benzoselenazole nucleus, naphthoselenazole nucleus, thiazoline nucleus, thiazolidine nucleus, oxazoline nucleus, oxazolidine nucleus, selenazoline nucleus, 2-quinoline nucleus, 4-quinoline nucleus, 1-isoquinoline nucleus, 3-isoquinoline nucleus, 3,3-dialkylindolenine nucleus, pyridine nucleus, and benzimidazole nucleus; and X represents an acid radical.

2. The photographic material of claim 1 wherein the photoconductive substance is zinc oxide.

3. A photographic light-sensitive silver halide emulsion containing a trimethine dye salt having the general formula:

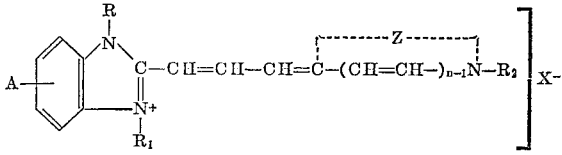

wherein:

A represents a benzoyl group in the 5- or 6-position of the benzimidazole nucleus;

R, $R_1$ and $R_2$ each represents an alkyl group, a substituted alkyl group, an allyl group, an aryl group, a substituted aryl group, a benzyl group, a substituted benzyl group or a cycloalkyl group;

$n$ represents 1 or 2;

Z represents a member of the group selected from the group consisting of a thiazole nucleus, benzothiazole nucleus, naphthothiazole nucleus, thionaphtheno [7,6-d]thiazole nucleus, oxazole nucleus, benzoxazole nucleus, naphthoxazole nucleus, selenazole nucleus, benzoselenazole nucleus, naphthoselenazole nucleus, thiazoline nucleus, thiazolidine nucleus, oxazoline nucleus, oxazolidine nucleus, selenazoline nucleus, 2-quinoline nucleus, 4-quinoline nucleus, 1-isoquinoline nucleus, 3-isoquinoline nucleus, 3,3-dialkylindolenine nucleus, pyridine nucleus, and benzimidazole nucleus; and X represents an acid radical.

4. The photographic light-sensitive silver halide emulsion of claim 3 wherein the trimethine dye salt has the formula:

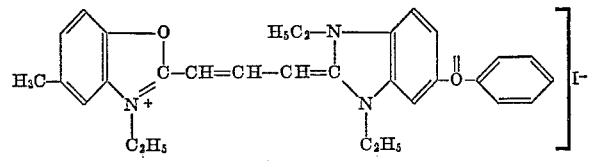

5. The photographic light-sensitive silver halide emulsion of claim 3 wherein the trimethine dye salt has the formula:

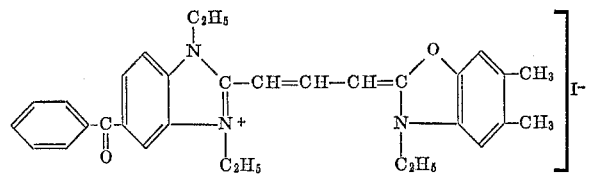

6. The photographic light-sensitive silver halide emulsion of claim 3 wherein the trimethine dye salt has the formula:

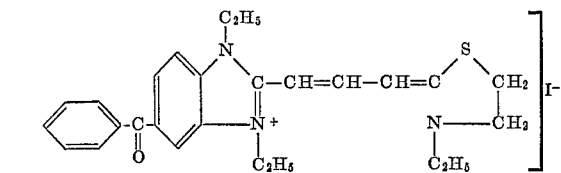

References Cited

UNITED STATES PATENTS 3,268,334   8/1966   Depoorter et al. _____ 96—106

J. TRAVIS BROWN, Primary Examiner

U.S. Cl. X.R.

96—106